United States Patent
Tohriyama et al.

(10) Patent No.: US 11,562,272 B2
(45) Date of Patent: Jan. 24, 2023

(54) EVALUATING APPARATUS

(71) Applicants: TOYOTA JIDOSHA KABUSHIKI KAISHA, Toyota (JP); THE UNIVERSITY OF TOKYO, Bunkyo-ku (JP)

(72) Inventors: Kyoichi Tohriyama, Yokohama (JP); Takuma Ito, Bunkyo-ku (JP); Masatsugu Soya, Bunkyo-ku (JP); Minoru Kamata, Bunkyo-ku (JP)

(73) Assignees: TOYOTA JIDOSHA KABUSHIKI KAISHA, Toyota (JP); THE UNIVERSITY OF TOKYO, Bunkyo-ku (JP)

( * ) Notice: Subject to any disclaimer, the term of this patent is extended or adjusted under 35 U.S.C. 154(b) by 416 days.

(21) Appl. No.: 16/800,249

(22) Filed: Feb. 25, 2020

(65) Prior Publication Data
US 2020/0272922 A1 Aug. 27, 2020

(30) Foreign Application Priority Data
Feb. 27, 2019 (JP) .............................. JP2019-033803

(51) Int. Cl.
*G06N 5/04* (2006.01)
*G06N 20/00* (2019.01)
(Continued)

(52) U.S. Cl.
CPC ............. *G06N 5/048* (2013.01); *B60W 40/00* (2013.01); *G06N 20/00* (2019.01); *G07C 5/0808* (2013.01); *G07C 5/0825* (2013.01)

(58) Field of Classification Search
CPC ....... G06N 5/048; G06N 20/00; B60W 40/00; G07C 5/0808; G07C 5/0825;
(Continued)

(56) References Cited

U.S. PATENT DOCUMENTS

| | | | |
|---|---|---|---|
| 2014/0058761 A1* | 2/2014 | Freiberger | G06Q 10/0639 705/4 |
| 2015/0088335 A1* | 3/2015 | Lambert | G08G 1/20 701/1 |
| 2017/0144671 A1* | 5/2017 | Memani | B60W 40/09 |

FOREIGN PATENT DOCUMENTS

| | | | |
|---|---|---|---|
| JP | 2018032343 A | 3/2018 | |
| JP | 2018097804 A | 6/2018 | |

(Continued)

*Primary Examiner* — Joseph J Dallo
(74) *Attorney, Agent, or Firm* — Hunton Andrews Kurth LLP

(57) ABSTRACT

An evaluating apparatus is provided with: a first acquirer configured to obtain a feature value indicating driving behavior of a driver; a classifier configured to classify a plurality of feature values obtained from a plurality of drivers, into a plurality of groups; a second acquirer configured to obtain the feature value that is representative in each of the plurality of groups, as a representative feature value; a ranking device configured to give a rank corresponding to a driving carefulness degree, to each of the plurality of groups, on the basis of the representative feature value; and a determinator configured to determine a driver type corresponding to the driving carefulness degree of the driver, on the basis of a rank of a group into which the feature value of the driver is classified.

9 Claims, 12 Drawing Sheets

(51) Int. Cl.
*G07C 5/08* (2006.01)
*B60W 40/00* (2006.01)

(58) Field of Classification Search
CPC .. G07C 5/0841; G08G 1/0112; G08G 1/0129; G08G 1/164; G06K 9/6218; G06K 9/6267
See application file for complete search history.

(56) References Cited

FOREIGN PATENT DOCUMENTS

| WO | WO-2005035321 A1 | * | 4/2005 | ............ B60W 40/02 |
| WO | WO-2008144576 A1 | * | 11/2008 | ............. G07C 5/008 |
| WO | 2018163288 A1 | | 9/2018 | |
| WO | WO-2019070473 A1 | * | 4/2019 | ........... G05D 1/0055 |

* cited by examiner

FIG. 3

|  | FEATURE VALUE 1 | FEATURE VALUE 2 | FEATURE VALUE 3 | CLASSIFICATION CLUSTER |
|---|---|---|---|---|
| ID1 1st | −0.45 | −1.63 | −0.89 | CLUSTER 1 |
| ID1 2nd | 0.98 | 0.23 | 0.38 | CLUSTER 2 |
| ID1 3rd | 1.28 | −0.19 | 0.94 | CLUSTER 1 |
| ID2 1st | 0.87 | −0.48 | 0.27 | CLUSTER 2 |
| ID2 2nd | 1.01 | 2.53 | 3.04 | CLUSTER 2 |
| ID2 3rd | 0.78 | −0.05 | 1.06 | CLUSTER 1 |
| ID3 1st | 1.07 | 0.66 | 1.00 | CLUSTER 3 |
| ID3 2nd | 0.81 | 0.19 | 0.97 | CLUSTER 3 |
| ID3 3rd | 0.98 | −0.19 | 0.04 | CLUSTER 3 |
| ⋮ | ⋮ | ⋮ | ⋮ | ⋮ |

|  | FEATURE VALUE 1 AVERAGE | FEATURE VALUE 2 AVERAGE | FEATURE VALUE 3 AVERAGE | OVERALL AVERAGE |
|---|---|---|---|---|
| CLUSTER 1 AVERAGE | −0.09 | −0.08 | 0.002 | −0.05 |
| CLUSTER 2 AVERAGE | 0.80 | 0.37 | 0.81 | 0.66 |
| CLUSTER 3 AVERAGE | 0.80 | 0.16 | 0.05 | 0.34 |

|  | RANK |
|---|---|
| CLUSTER 1 | 3 |
| CLUSTER 2 | 1 |
| CLUSTER 3 | 2 |

FIG. 5

| ID | 1st | 2nd | 3rd | DRIVER TYPE ACCORDING TO THE POINT |
|---|---|---|---|---|
| 1 | 3 | 3 | 3 | 3 |
| 2 | 2 | 2 | 2 | 2 |
| 3 | 2 | 2 | 1 | 2 |
| 4 | 3 | 2 | 3 | 3 |
| 5 | 3 | 1 | 1 | 1 |
| ⋮ | ⋮ | ⋮ | ⋮ | ⋮ |

FIG. 6

| ID | 1st | 2nd | 3rd | DRIVER TYPE ACCORDING TO THE POINT |
|---|---|---|---|---|
| 1 | 2 | 3 | 3 | 3 |
| 2 | 2 | 2 | 2 | 2 |
| 3 | 1 | 1 | 2 | 1 |
| 4 | 3 | 2 | 1 | 1 |
| 5 | 1 | 1 | 1 | 1 |
| ⋮ | ⋮ | ⋮ | ⋮ | ⋮ |

| | 1st | 2nd | 3rd | 4th | 5th | 6th |
|---|---|---|---|---|---|---|
| CLASSIFICATION RANK | 3 | 1 | 1 | 2 | 2 | 3 |
| WEIGHTING FACTOR | 1 | 2 | 3 | 4 | 5 | 6 |

| RANK 1 | 5 |
|---|---|
| RANK 2 | 9 |
| RANK 3 | 7 |

FIG. 8

| ID | LOCATION 1 | LOCATION 2 | LOCATION 3 | LOCATION 4 | DRIVER TYPE |
|---|---|---|---|---|---|
| 1 | 3 | 3 | 3 | 3 | 3 |
| 2 | 2 | 2 | 1 | 2 | 2 |
| 3 | 2 | 1 | 1 | 1 | 1 |
| 4 | 3 | 1 | 1 | 1 | 1 |
| 5 | 1 | 1 | 1 | 1 | 1 |
| ⋮ | ⋮ | ⋮ | ⋮ | ⋮ | ⋮ |

EVALUATING APPARATUS

CROSS-REFERENCE TO RELATED APPLICATIONS

This application is based upon and claims the benefit of priority of the prior Japanese Patent Application No. 2019-033803, filed on Feb. 27, 2019, the entire contents of which are incorporated herein by reference.

BACKGROUND

1. Technical Field

Embodiments of the present disclosure relate to an evaluating apparatus configured to perform an evaluation of a risk during traveling of a vehicle.

2. Description of the Related Art

For this type of apparatus, there is known an apparatus configured to evaluate a risk in a section in which a vehicle travels, on the basis of surrounding information (or in other words, environment information). For example, Japanese Patent Application Laid Open No. 2018-032343 (Patent Literature 1) discloses an apparatus configured to evaluate a current or future accident occurrence risk by using map information indicating topography or geographical features in a geographical area.

As in a technology/technique described in the Patent Literature 1, a risk in some location depends on the surrounding information, but it is hard to accurately evaluate a risk on the basis of only the surrounding information. Moreover, in some cases, the surrounding information used for the evaluation itself may be imperfect (e.g., old map information, etc.).

In the evaluation of the risk, it is considered that an action actually taken by a driver (e.g., releasing a foot from an accelerator pedal, or stepping on a brake pedal, etc.) can be used, in addition to the surrounding information described above. The driver's action, however, may vary depending, for example, on a carefulness degree for the driving (hereinafter referred to as a "driving carefulness degree", as occasion demands) or the like, and it is thus not easy to receive the same evaluation of the risk from all drivers. The Patent Literature 1 does not mention the driver's driving carefulness degree, and there is room for improvement in the risk evaluation.

SUMMARY

In view of the aforementioned problem, it is therefore an object of embodiments of the present disclosure to provide an evaluating apparatus that can classify characteristics of drivers used for the risk evaluation.

An aspect of an evaluating apparatus according to the present disclosure is an evaluating apparatus provided with: a first acquirer configured to obtain a feature value indicating driving behavior of a driver, from driving data of a vehicle in a risk section in which it is evaluated on the basis of surrounding information that there is a risk; a classifier configured to classify a plurality of feature values obtained from a plurality of drivers, into a plurality of groups, on the basis of a similarity degree of the driving behavior, which is indicated by each of the plurality of feature values; a second acquirer configured to obtain the feature value that is representative in each of the plurality of groups, as a representative feature value; a ranking device configured to give a rank corresponding to a driving carefulness degree, to each of the plurality of groups, on the basis of the representative feature value; and a determinator configured to determine a driver type corresponding to the driving carefulness degree of the driver, on the basis of a rank of a group into which the feature value of the driver is classified.

BRIEF DESCRIPTION OF THE DRAWINGS

FIG. 3 is a table illustrating an example of clustering of the feature values;

FIG. 5 is a table illustrating an example of a method of determining a driver type according to the point from a most frequent value;

FIG. 6 is a table illustrating an example of a method of determining the driver type according to the point from a newest value;

FIG. 8 is a table illustrating an example of a method of determining a driver type from the driver type according to the point;

DETAILED DESCRIPTION OF THE EMBODIMENT

Hereinafter, an evaluating apparatus according to an embodiment of the present disclosure will be explained with reference to the drawings.

<Configuration of Evaluating Apparatus>

Figure 1:
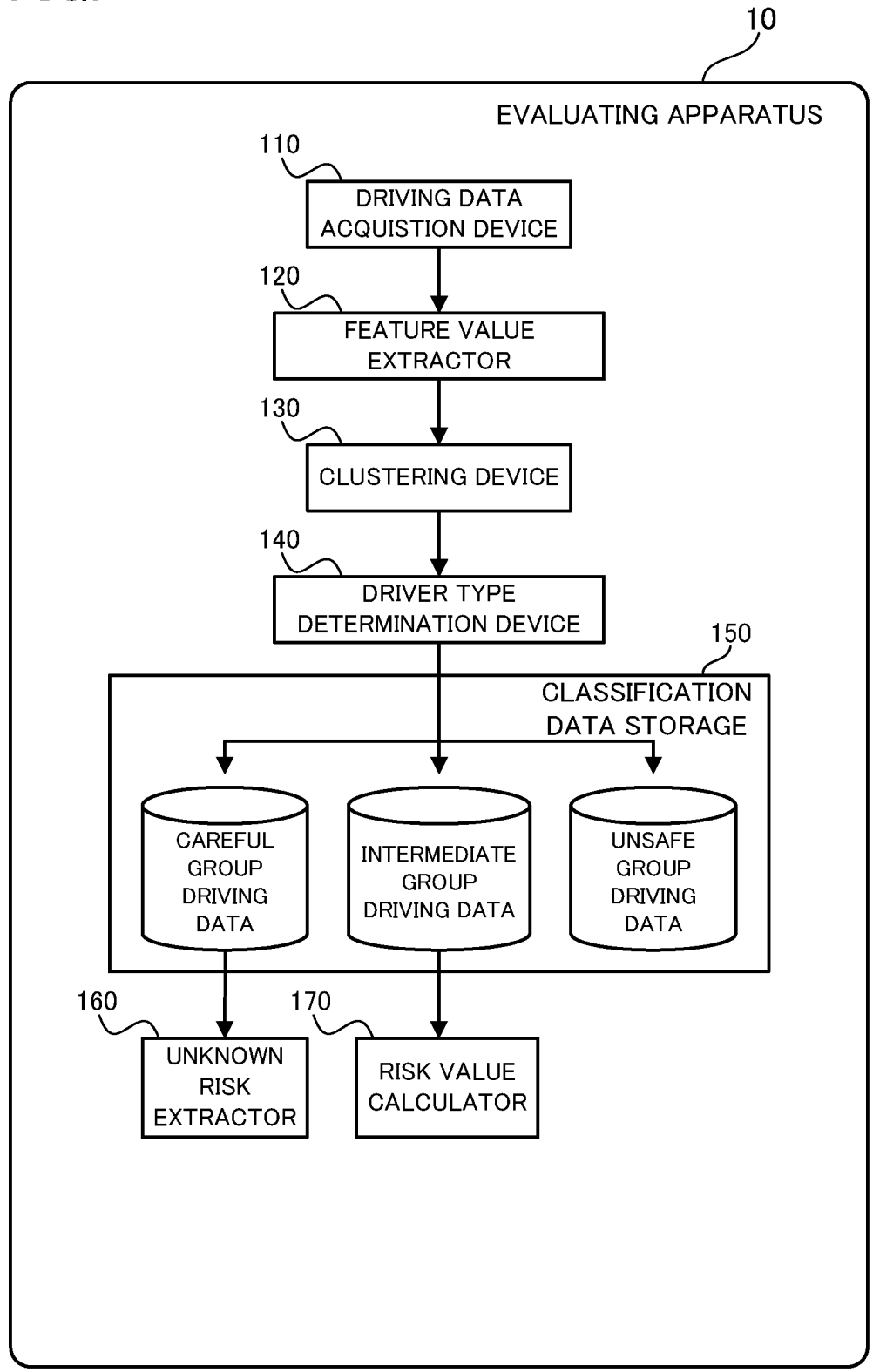
FIG. 1 is a block diagram illustrating a configuration of an evaluating apparatus according to an embodiment.

Firstly, a configuration of the evaluating apparatus according to the embodiment will be explained with reference to FIG. 1. FIG. 1 is a block diagram illustrating the configuration of the evaluating apparatus according to the embodiment.

In FIG. 1, an evaluating apparatus 10 according to the embodiment is configured to evaluate a risk (e.g., a risk of a collision, etc.) in a section in which a vehicle travels. The evaluating apparatus 10 is provided, for example, with an arithmetic apparatus, a memory, and the like. The evaluating apparatus 10 is provided with a driving data acquisition device 110, a feature value extractor 120, a clustering device 130, a driver type determination device 140, a classification data storage 150, an unknown risk extractor 160, and a risk value calculator 170, as physical processing circuits or logical processing blocks that constitute functions thereof.

The driving data acquisition device 110 is configured to obtain driving data including various parameters of a traveling vehicle and position information. The driving data acquisition device 110 is configured to obtain a plurality of driving data (which is specifically driving data obtained at a plurality of times from a plurality of vehicles (or drivers)). Moreover, the driving data acquisition device 110 according to the embodiment is particularly configured to obtain the driving data on a risk section in which it is evaluated from surrounding information that there is a risk (e.g., a section in which there is an intersection, a curve, or the like). The "surrounding information" herein may be information about a road shape, a structure in surroundings of a road, or the like that can be obtained in advance (which is typically map information), and may not include information that is obtained in real time on a traveling vehicle (e.g., information about a moving obstacle, etc.). A detailed explanation of a method of evaluating whether or not there is a risk from the surrounding information (e.g., a method of evaluating a risk section) will be omitted herein because the existing technologies/techniques can be adopted to the method, as occasion demands. The driving data acquisition device 110 may be further configured to obtain the driving data on a non-risk section in which it cannot be evaluated from the surrounding information that there is a risk.

The feature value extractor 120 is configured to obtain (or extract) a feature value indicating the driver's driving behavior, from the various parameters included in the driving data on the risk section obtained on the driving data acquisition device 110. The feature value extractor 120 may be further configured to obtain (or extract) the feature value indicating the driver's driving behavior, from the driving data on the non-risk section obtained on the driving data acquisition device 110. The feature value to be obtained by the feature value extractor 120 may be set in advance as an amount related to a driving carefulness degree, out of the parameters included in the driving data (or parameters that can be calculated by at least partially using the driving data). A specific example of the feature value obtained by the feature value extractor 120 will be detailed later. The feature value extractor 120 may be configured to obtain a plurality of types of feature values. The feature value extractor 120 is a specific example of the "first acquirer" in Supplementary Notes described later.

The clustering device 130 is configured to classify (or cluster) the feature value(s) obtained by the feature value extractor 120 from the driving data on the risk section, into a plurality of groups (or clusters) on the basis of a similarity degree of the driving behavior. In other words, the clustering device 130 is configured to perform classification such that the feature values of drivers who have similar driving behaviors in the risk section are included in the same group. A clustering method can adopt the existing technologies/techniques, as occasion demands. As an example, a WARD method can be used. Moreover, the clustering device 130 is configured to give a rank indicating the driving carefulness degree, to the plurality of clusters classified. Specifically, the clustering device 130 may give the rank to the clusters on the basis of an average value of the feature values classified into the respective clusters. The clustering device 130 is a specific example of the "classifier", the "second acquirer", and the "ranking device" in Supplementary Notes described later.

The driver type determination device 140 is configured to determine a driver type corresponding to the driving carefulness degree of the driver of the vehicle, on the basis of into which cluster each feature value is classified by the clustering device 130. The driver type determination device 140 is provided with: a first type determination device configured to determine a driver type according to the point, which is a driver type in each risk section; and a second type determination device configured to determine a final driver type from a plurality of driver types according to the point. A specific method of determining the driver type will be detailed later. The driver type determination device 140, the first type determination device, and the second type determination device are respectively specific examples of the "determinator", the "first type determinator", and the second type determinator" in Supplementary Notes described later.

The classification data storage 150 is configured to store the driving data obtained by the driving data acquisition device 110, for each driver type. In the embodiment, an explanation is given by using such an example that the driver type determination device 140 determines the driver type of each driver, from among three driver types (e.g., a driver type with the highest driving carefulness degree, a driver type with an intermediate driving carefulness degree, and a driver type with the lowest driving carefulness degree). In this case, the classification data storage 150 is configured to store each of "careful group driving data", which is the driving data of a driver who belongs to a careful group with the highest driving carefulness degree, "intermediate group driving data", which is the driving data of a driver who belongs to an intermediate group with the intermediate driving carefulness degree, and "unsafe group driving data", which is the driving data of a driver who belongs to an unsafe group with the lowest driving carefulness degree.

The unknown risk extractor 160 is configured to extract an unknown risk by using the careful group driving data stored in the classification data storage 150. The "unknown risk" herein may be a risk in a section in which it cannot be evaluated from the surrounding information that there is a risk (i.e., in the non-risk section other than the risk section) but in which a risk actually exists. The unknown risk may include, for example, a small promenade that is not included in the surrounding information, or the like. A specific method of extracting the unknown risk will be detailed later. The unknown risk extractor 160 is a specific example of the "extractor" in Supplementary Notes described later.

The risk value calculator 170 is configured to calculate a risk value indicating an extent of a risk in the risk section, by using the intermediate group driving data stored in the classification data storage 150. The risk value may be calculated, for example, at three stages of "large", "middle", and "small". A specific method of extracting the risk value will be detailed later. The risk value calculator 170 is a specific example of the "calculator" in Supplementary Notes described later.

<Explanation of Operations>

Next, operations of the evaluating apparatus 10 according to the embodiment will be specifically explained.

(Extraction of Feature Values)

Figure 2:
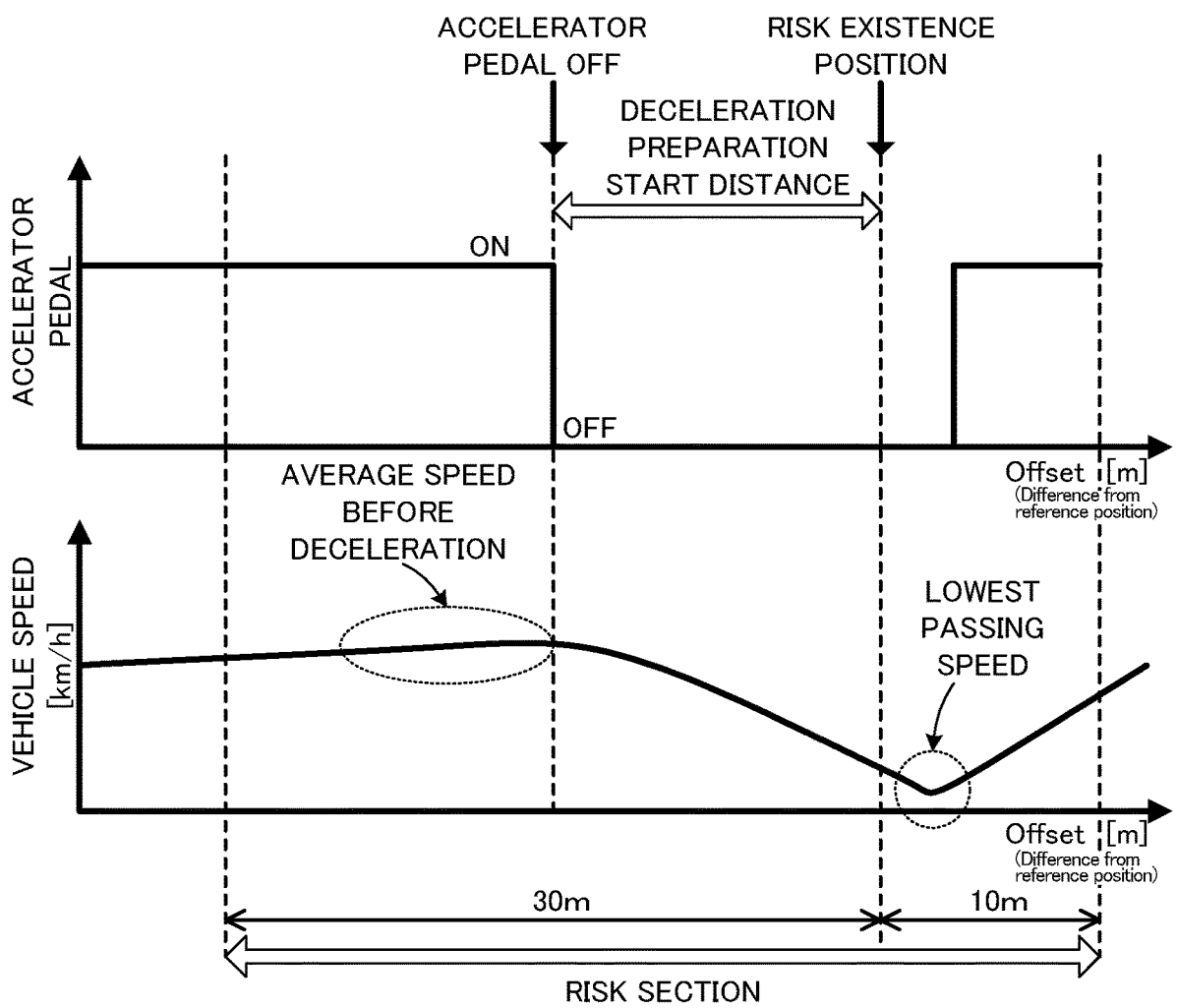
FIG. 2 is a graph illustrating an example of feature values extracted from driving data.

Firstly, an operation of extracting the feature values by the feature value extractor 120 will be explained with reference to FIG. 2. FIG. 2 is a graph illustrating an example of the feature values extracted from the driving data. FIG. 2 illustrates an accelerator pedal operation and a vehicle speed when the vehicle travels in the risk section including a risk existence position (i.e., an intersection). The risk section herein is set, for example, as a range of 30 meters on a near side of the risk existence position to 10 meters on a far side thereof.

As illustrated in FIG. 2, the following situation is presumed; when the vehicle travels in the risk section, an accelerator pedal is off (or released) before the risk existence position to start to decelerate, and after the vehicle passes the risk existence position, the accelerator pedal is stepped on to start to accelerate. The feature value extractor 120 may obtain a "deceleration preparation start distance", an "average speed before deceleration", and a "lowest passing speed", as the feature values, from the driving data of the vehicle as described above.

The deceleration preparation start distance may be a value corresponding to a distance to the risk existence position from a position in which an accelerator opening degree becomes zero last time before the risk existence position (hereinafter referred to as a "deceleration preparation start position" as occasion demands) (or in other words, the deceleration preparation start distance may be a value indicating how early an accelerator pedal is off (or released)). The average speed before deceleration may be an average speed in a fixed section immediately before the deceleration preparation start position (which is herein a 10-meter section on the near side of the deceleration preparation start position). The lowest passing speed may be the lowest value of the vehicle speed in the risk section. Each value of the feature values, which are the deceleration preparation start distance, the average speed before deceleration, and the lowest passing speed, may be obtained and then normalized (i.e., a process of making the magnitudes of the feature values uniform may be performed).

The aforementioned three feature values are merely an example, and in addition to or instead of those feature values, the feature value extractor 120 may obtain another feature value.

(Clustering of Feature Value)

Figure 4:
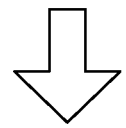
FIG. 4 is a table illustrating a method of determining a cluster rank from an average value of feature values of each cluster.

Next, an operation of clustering the feature values by the clustering device 130 will be explained with reference to FIG. 3 and FIG. 4. FIG. 3 is a table illustrating an example of clustering of the feature values. FIG. 4 is a table illustrating a method of determining a cluster rank from an average value of feature values of each cluster. An ID in FIG. 3 is an identification number given to each driver. Here, the driving data (or in other words, the feature values) shall be obtained three times for each driver.

As illustrated in FIG. 3, the clustering device 130 may classify the feature values of each driver, which is a set of three feature values (i.e., feature value 1: deceleration preparation start distance, feature value 2: average speed before deceleration, and feature value 3: lowest passing speed) obtained from one driving data, into a predetermined number of clusters. Hereafter, an explanation will be given by using such an example that the clustering device 130 classifies the feature values of each driver into three clusters (clusters 1 to 3). In the example in FIG. 3, the feature values obtained from the first driving data of a driver with ID1 are classified into the cluster 1. The feature values obtained from the first driving data of a driver with ID2 are classified into the cluster 2. The feature values obtained from the first driving data of a driver with ID3 are classified into the cluster 3.

As illustrated in FIG. 4, the clustering device 130 may calculate an average value for each cluster, from the feature values classified into three clusters. Specifically, the clustering device 130 may calculate an average value of the feature value 1 classified into the cluster 1, an average value of the feature value 2 classified into the cluster 1, and an average value of the feature value 3 classified into the cluster 1, and may calculate an overall average, which is an average of all the three feature values classified into the cluster 1, from the three average values. In the same manner, even for the cluster 2 and the cluster 3, the clustering device 130 may calculate respective average values of the feature values and overall average values. The overall average value calculated for each cluster is a specific example of the "representative characteristics amount" in Supplementary Notes described later.

Here, since each feature value is obtained as a parameter indicating the driving carefulness degree of the driver, the calculated overall average value corresponds to how high the driving carefulness degree is (wherein a negative number indicates a higher driving carefulness degree). Thus, the clustering device 130 may give a rank indicating the driving carefulness degree, to each cluster, on the basis of the calculated overall average value. In the example in FIG. 4, a "rank 3" indicating the highest driving carefulness degree is given to the cluster 1, a "rank 1" indicating the lowest driving carefulness degree is given to the cluster 2, and a "rank 2" indicating the intermediate driving carefulness degree is given to the cluster 3.

(Determination of Driver Type)

Figure 7:
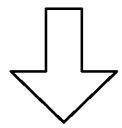
FIG. 7 is a table illustrating an example of a method of determining the driver type according to the point by using weighting.

Next, an operation of determining the driver type by the driver type determination device 140 will be explained with reference to FIG. 5 to FIG. 8. FIG. 5 is a table illustrating an example of a method of determining a driver type according to the point from a most frequent value. FIG. 6 is a table illustrating an example of a method of determining the driver type according to the point from a newest value. FIG. 7 is a table illustrating an example of a method of determining the driver type according to the point by using weighting. FIG. 8 is a table illustrating an example of a method of determining a driver type from the driver type according to the point. For convenience of explanation, data illustrated in FIG. 5 to FIG. 8 is data based on a specific example of the feature values, which is different from the data used in the explanation so far (e.g., the specific examples of the feature values in FIG. 3 and FIG. 4).

The data illustrated in FIG. 5 indicates into which cluster (or rank) the feature value obtained in one risk section is classified for each driver. For example, all the feature values obtained from the first, second, and third driving data of the driver with ID1 are classified into a cluster of the rank 3. All the feature values obtained from the first, second, and third driving data of the driver with ID2 are classified into a cluster of the rank 2. The feature value obtained from the first, second, and third driving data of the driver with ID3 are respectively classified into clusters of the rank 2, the rank 2, and the rank 3.

The driver type determination device 140 (or specifically, the first type determination device) may determine the driver type according to the point corresponding to the driver type in one risk section, on the basis of into what rank of cluster each feature value is classified, as described above. Specifically, the driver type determination device 140 may determine a type corresponding to the rank of the cluster into which the feature values are most frequently classified (or in other words, a most frequent value of the ranks classified), among a total of three times of first, second, and third times, to be the driver type according to the point of the driver. For example, for the driver with ID1, since the classification is made to the cluster of the rank 3 all the three times, the location drive type is determined to be a "type 3" corresponding to the rank 3. For the driver with ID2, since the classification is made to the cluster with the rank 2 all the three times, the location drive type is determined to be a "type 2" corresponding to the rank 2. For the driver with ID3, since the classification is made to the cluster of the rank 2 twice and to the cluster of the rank 1 once, the location drive type is determined to be the "type 2" corresponding to the rank 2.

As illustrated in FIG. 6, if the driver type determination device 140 cannot determine the driver type according to the point by using the most frequent value of the clusters classified, the driver type determination device 140 may determine a type corresponding to the rank of the cluster into which the most lately obtained feature value is classified, to be the location drive type. For example, the feature values obtained from the first, second, and third driving data of a driver with ID4 are respectively classified into the clusters of the rank 3 once, the rank 2 once, and the rank 1 once, and the driver type according to the point cannot be determined from the most frequent value of the ranks classified. In this case, the driver type determination device 140 may determine a "type 1" corresponding to the rank 1, which is the rank of the cluster into which the most lately obtained feature value (which is herein the feature value obtained at the third time) is classified, to the driver type according to the point of the driver with ID4.

As illustrated in FIG. 7, the driver type determination device 140 may perform weighting on the rank of the classified cluster in such a manner that a more lately obtained feature value has a larger weight, and on the basis of a score calculated therefrom, the driver type determination device 140 may determine the location drive type. For example, the feature values obtained from the first to sixth driving data of a driver illustrated in FIG. 7 are respectively classified into the clusters of the rank 3, the rank 1, the rank 1, the rank 2, the rank 2, and the rank 3, in acquisition order. Then, there are given a weighting factor of "1" for the first feature value, a weighting factor of "2" for the second, a weighting factor of "3" for the third, a weighting factor of "4" for the fourth, a weighting factor of "5" for the fifth, and a weighting factor of "6" for the sixth. In this case, if a score with the weighting factor added is calculated for each rank, the score of the rank 1 is "5", the score of the rank 2 is "9", and the score of the rank 3 is "7". Thus, the driver type determination device 140 may determine the driver type according to the point of this driver to be the "type 2" corresponding to the rank 2 with the highest score.

As illustrated in FIG. 8, after determining the driver type according to the point in each risk section, the driver type determination device 140 (or specifically, the second type determination device) may determine the final driver type from the driver type according to the point in each risk section. Specifically, the driver type determination device 140 may determine a most frequent value of a plurality of driver types according to the point determined for each driver, to be the driver type of the driver. For example, for the driver with ID1 illustrated in FIG. 7, all the driver types according to the point of the driver in a location 1 (i.e., risk section 1) to a location 4 (i.e., risk section 4) are the "type 3", and thus, the driver type is determined to be the "type 3". For the driver with ID2, three of the driver types according to the point of the driver in the location 1 to the location 4 are the "type 2" and one of them is a "type 1", and thus, the driver type is determined to be the "type 2". For the driver with ID3, one of the driver types according to the point of the driver in the location 1 to the location 4 is the "type 2" and three of them are the "type 1", and thus, the driver type is determined to be the "type 1".

When the driver type is determined as described above, the driving data of each driver may be stored in the classification data storage 150. Specifically, the driving data of the driver whose driver type is determined to be the "type 3 (i.e., the type with the highest driving carefulness degree)" may be stored as the careful group driving data in the classification data storage 150. The driving data of the driver whose driver type is determined to be the "type 2 (i.e., the type with the intermediate driving carefulness degree)" may be stored as the intermediate group driving data in the classification data storage 150. The driving data of the driver whose driver type is determined to be the "type 1 (i.e., the type with the lowest driving carefulness degree)" may be stored as the unsafe group driving data in the classification data storage 150. As described above, the classification data storage 150 may store the driving data for each driver classified by the driver type.

(Extraction of Unknown Risk)

Figure 9:
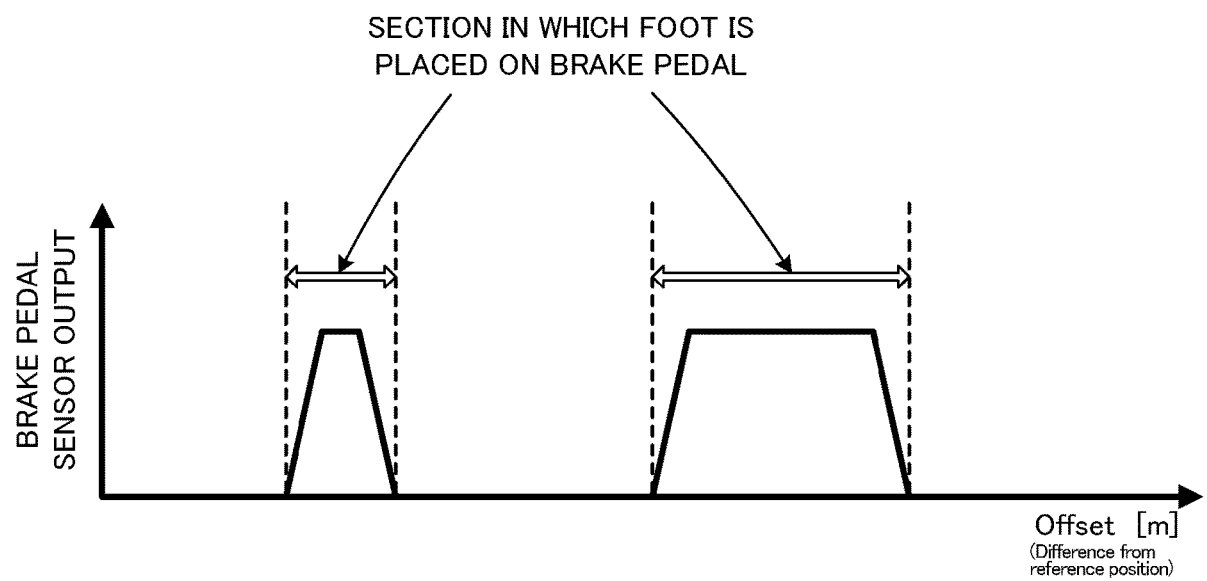
FIG. 9 is a graph illustrating a section in which a foot is placed on a brake pedal.
Figure 10:
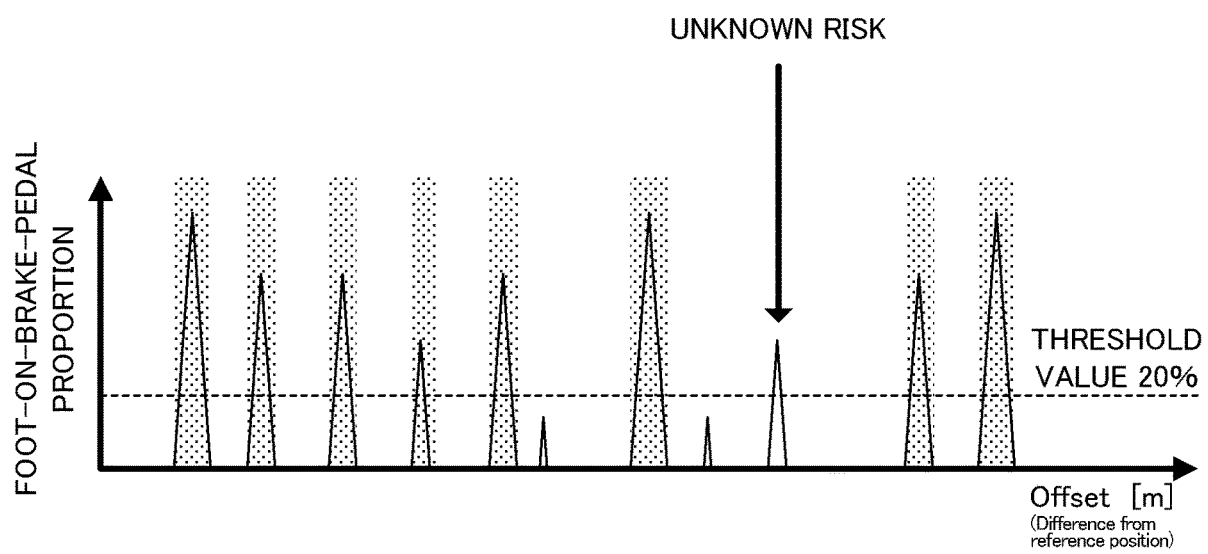
FIG. 10 is a graph illustrating a method of extracting an unknown risk on the basis of a foot-on-brake-pedal proportion.

Next, an operation of extracting the unknown risk by the unknown risk extractor 160 will be explained with reference to FIG. 9 and FIG. 10. FIG. 9 is a graph illustrating a section in which a foot is placed on a brake pedal. FIG. 10 is a graph illustrating a method of extracting the unknown risk on the basis of a foot-on-brake-pedal proportion.

As illustrated in FIG. 9, the unknown risk extractor 160 may firstly obtain information about a section in which a foot is placed on a brake pedal, from a plurality of driving data stored as the careful group driving data in the classification data storage 150 (i.e., the driving data of drivers of the type with the highest driving carefulness degree). The unknown risk extractor 160 may then calculate a proportion of drivers who place their feet on brake pedals (hereinafter referred to as the "foot-on-brake-pedal proportion" as occasion demands) for each section.

As illustrated in FIG. 10, the foot-on-brake-pedal proportion is high mostly in a place corresponding to a predetermined exclusion section including the risk section (e.g., a place of a right or left turn, before a curve, in the middle of a slope, a location in which deceleration is legally required, such as a stop sign) (refer to a hatched portion in FIG. 10). Other than the exclusion section, however, there may be a section in which the foot-on-brake-pedal proportion exceeds a predetermined threshold value (which is 20% herein). The unknown risk extractor 160 may extract such a section, as a section in which there is an unknown risk. It is because it can be determined that there is some risk that cannot be determined only from the surrounding information, from such a result that more than 20% of the drivers of the rank with the highest driving carefulness degree place their feet on the brake pedals. The threshold value 20% herein is merely an example, and a different threshold value may be set depending on situations.

(Calculation of Risk Value)

Figure 11:
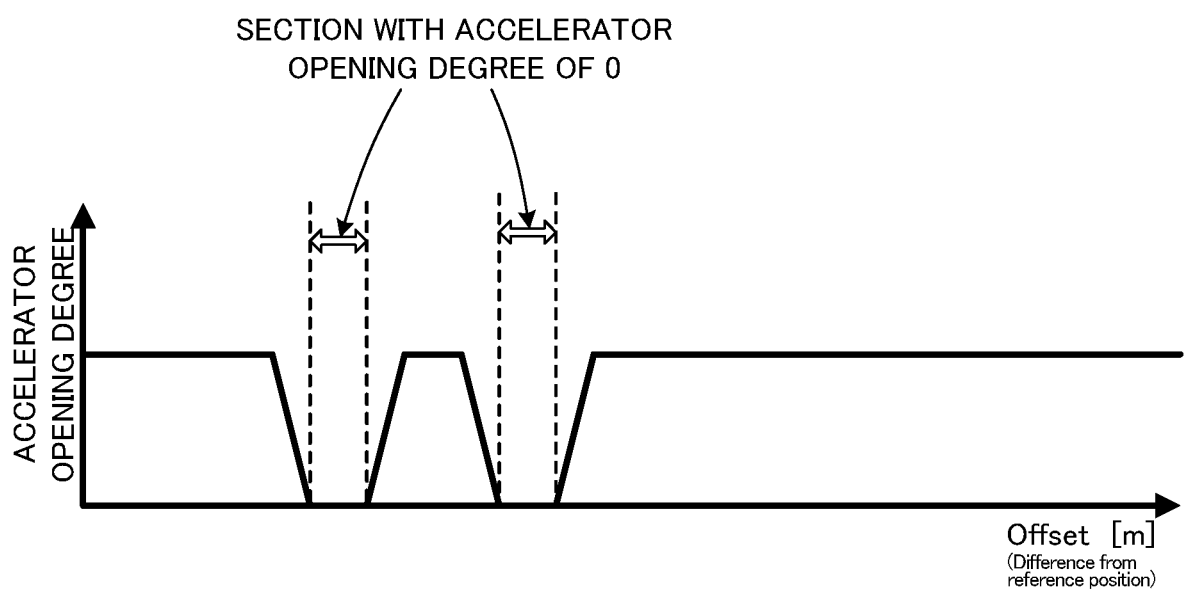
FIG. 11 is a graph illustrating a section with an accelerator opening degree of 0.
Figure 12:
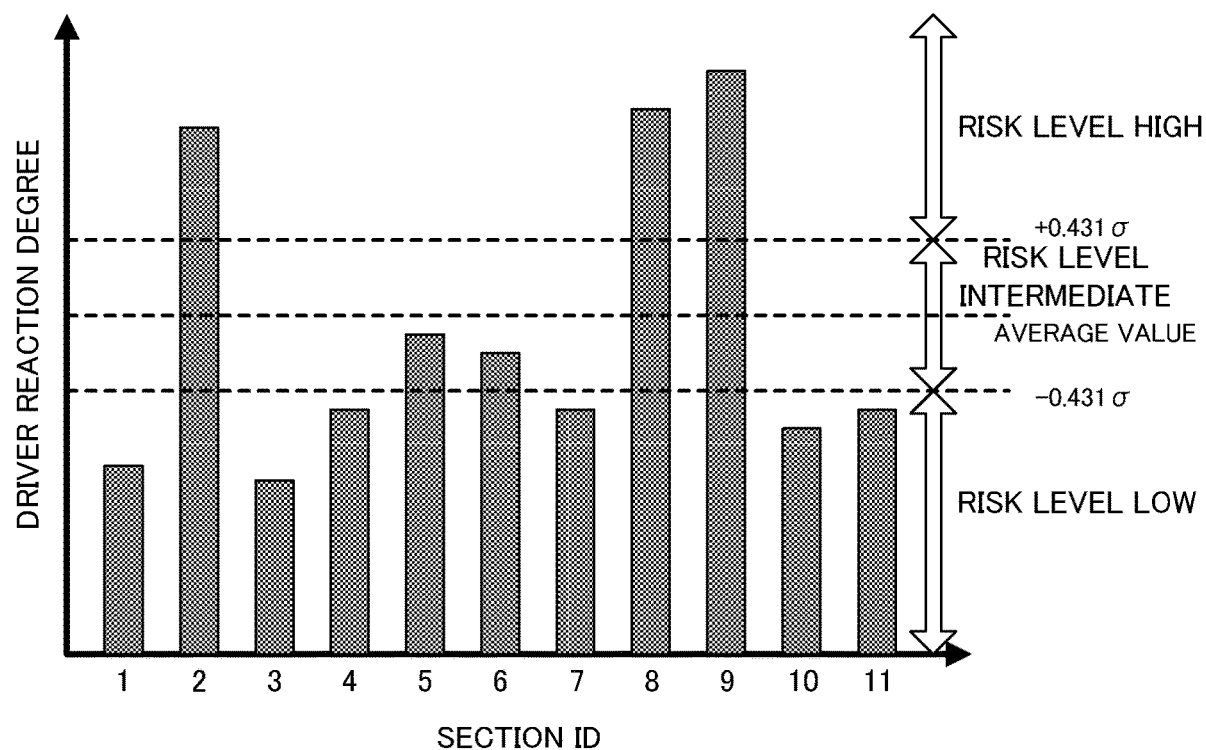
FIG. 12 is a graph illustrating an example of a method of calculating a risk value on the basis of an accelerator off period proportion.

Next, an operation of calculating the risk value by the risk value calculator 170 will be explained with reference to FIG. 11 and FIG. 12. FIG. 11 is a graph illustrating a section with an accelerator opening degree of 0. FIG. 12 is a graph illustrating an example of a method of calculating the first risk value on the basis of an accelerator off period proportion.

As illustrated in FIG. 11, the risk value calculator 170 may firstly obtain information about a section with an accelerator opening degree of 0, from a plurality of driving data stored as the intermediate driving data in the classification data storage 150 (i.e., the driving data of drivers of the type with the intermediate driving carefulness degree). The risk value calculator 170 may then calculate a proportion of drivers with an accelerator opening degree of 0 at each position (hereinafter referred to as an "accelerator off proportion" as occasion demands). The risk value calculator 170 may also calculate a maximum value of the accelerator off proportion in the risk section, as reactivity of the drivers to the risk in the section (hereinafter referred to as "driver reaction degree" as occasion demands).

As illustrated in FIG. 12, the risk value calculator 170 may classify the driver reaction degree in each of sections (which are a section 1 to a section 11 herein), into three stages, with an average value of +0.431σ as a threshold value (i.e., into three stages on the assumption that the driver reaction degree follows a normal distribution). The risk value calculator 170 may then calculate the risk value in a section in which the driver reaction degree is greater than +0.431σ to be "large", the risk value in a section in which the driver reaction degree is between +0.431σ and −0.431σ to be "middle", and the risk value in a section in which the driver reaction degree is less than −0.431σ to be "small". In the example illustrated in FIG. 12, the risk values in the sections 2, 8, and 9 are calculated to be "large", the risk values in the sections 5 and 6 are calculated to be "middle", and the risk values in the sections 1, 3, 4, 7, 10 and 11 are calculated to be "small".

<Technical Effect>

Next, a technical effect obtained by the evaluating apparatus 10 according to the embodiment will be explained.

As explained in FIG. 1 to FIG. 12, according to the evaluating apparatus 10 in the embodiment, a plurality of drivers may be classified in accordance with the driving carefulness degree, by the clustering using the feature values obtained from a plurality of driving data. In other words, the evaluating apparatus 10 can classify the characteristics of the drivers. As a result, the evaluating apparatus 10 can classify and store the driving data of the plurality of drivers, in accordance with the driver type corresponding to the driving carefulness degree. Here, in particular, it can be considered that the risk in each section can be evaluated on the basis of the drivers' driving behavior. It is, however, not easy to accurately evaluate the risk from the driving data of all the drivers, because each driver has a different tendency in the driving behavior. For example, there may be a careful driver who sufficiently decelerates even for a small risk, whereas there may be a driver who does not decelerate even with some risks. If both the drivers are treated in the same manner, the risk cannot be evaluated with precision.

In the embodiment, however, the driving data of the drivers is classified in accordance with the driving carefulness degree (i.e., the driver type), and it is thus possible to preferably perform a risk evaluation. For example, a driver with a high driving carefulness degree presumably has higher safety consciousness than that of a driver with a low driving carefulness degree, and can easily find a risk in the section in which the vehicle travels. Thus, by using the driving data of the driver with the high driving carefulness degree (i.e., the careful group driving data), it is possible to extract an unknown risk.

In the embodiment, the unknown risk is extracted by using the driving data of the drivers of the driver type with the highest driving carefulness degree (i.e., the careful group driving data), but the unknown risk may be extracted by using the driving data of drivers of a plurality of driver types with a relatively high driving carefulness degree. For example, if the driving data of the drivers is classified into five stages, the unknown risk may be extracted by using the driving data of drivers of driver types with the highest and second highest driving carefulness degree.

Moreover, a driver with the intermediate driving carefulness degree can be estimated to be an average driver whose driving carefulness degree is not extremely high nor low. Thus, by using the driving data of the drivers with the intermediate driving carefulness degree (i.e., the intermediate group driving data), the risk value indicating the extent of a risk in the risk section can be calculated as a value that is close to the feelings of most drivers In the embodiment, the risk value is calculated by using the driving data of the drivers of the driver type with the intermediate driving carefulness degree, but the risk value may be extracted from the driving data of other drivers. Specifically, by using the driving data of drivers of the same type as that of a predetermined driver model, the risk value can be calculated as a value that is close to the feeling of the predetermined driver model. For example, if a "skillful driver" is used as the predetermined driver model, it is possible to calculate a risk value that is close to the feeling of the skillful driver.

If the predetermined driver model is set, firstly, the driver type of the predetermined driver model is determined. Specifically, it is determined into which cluster the feature value(s) obtained from the driving data of the predetermined driver model is classified, and to which driver type the predetermined driver model finally belongs. Then, the risk value may be calculated by using the driving data of other drivers of the same driver type as that of the predetermined driver mode.

<Supplementary Notes>

Various aspects of embodiments of the present disclosure derived from the embodiment explained above will be explained hereinafter.

(Supplementary Note 1)

An evaluating apparatus described in Supplementary Note 1 is provided with: a first acquirer configured to obtain a feature value indicating driving behavior of a driver, from driving data of a vehicle in a risk section in which it is evaluated on the basis of surrounding information that there is a risk; a classifier configured to classify a plurality of feature values obtained from a plurality of drivers, into a plurality of groups, on the basis of a similarity degree of the driving behavior, which is indicated by each of the plurality of feature values; a second acquirer configured to obtain the feature value that is representative in each of the plurality of groups, as a representative feature value; a ranking device configured to give a rank corresponding to a driving carefulness degree, to each of the plurality of groups, on the basis of the representative feature value; and a determinator configured to determine a driver type corresponding to the driving carefulness degree of the driver, on the basis of a rank of a group into which the feature value of the driver is classified.

According to the evaluating apparatus described in Supplementary Note 1, the feature values obtained from the driving data in the risk section are classified into a plurality of groups. Then, the rank corresponding to the driving carefulness degree is given to each of the plurality of groups, on the basis of the representative feature value, which is representative in each of the plurality of groups classified. For example, if the feature values are classified into three groups, a "rank 1" is given to a group with the lowest driving carefulness degree, a "rank 2" is given to a group with the intermediate driving carefulness degree, and a "rank 3" is given to a group with the highest driving carefulness degree, After the rank is given to each of the plurality of groups, the driver type corresponding to the driving carefulness driver of the driver is determined. Specifically, the driver type may be determined on the basis of into which group the feature value obtained from the driving data of the driver is classified. By determining the driver type in this manner, it is possible to type or classify a plurality of drivers in accordance with the driving carefulness degree. Specifically, for example, a driver with a high driving carefulness degree, a driver with an intermediate driving carefulness degree, and a driver with a low driving carefulness degree can be divided in accordance with their respective ranks. As a result, it is possible to perform an evaluation regarding the risk, by using their driving data.

(Supplementary Note 2)

In an evaluating apparatus described in Supplementary Note 2, the determinator includes: (i) a first type determinator configured to determine a driver type according to the point, which is the driver type of one driver in one risk section, on the basis of a rank of a group into which a location feature value, which is the feature value of the one driver in the one section, is classified; and (ii) a second type determinator configured to determine the driver type of the one driver, on the basis of the driver types according to the point of the one driver in a plurality of risk sections.

According to the evaluating apparatus described in Supplementary Note 2, the driver type according to the point, which is the driver type of one driver in one risk section, is firstly determined, and then, the driver type of the driver (in other words, an overall driver type that takes into account a plurality of driver types according to the point) is determined on the basis of the plurality of driver types according to the point. By virtue of such a configuration, it is possible to more accurately determine the driver type, in view of a difference in the feature value of the driver at each point.

(Supplementary Note 3)

In an evaluating apparatus described in Supplementary Note 3, if a plurality of location feature values are obtained by the first acquirer and if the plurality of location feature values are classified by the classifier into respective different groups, the first type determinator is configured to determine the driver type according to the point of the one driver in the one risk section, on the basis of a rank of a group into which the plurality of location feature values are classified most frequently.

According to the evaluating apparatus described in Supplementary Note 3, if the plurality of location feature values of the one driver in the one risk section (which is specifically a plurality of location feature values obtained in different timing) are classified into different groups, the driver type according to the point of the one driver is determined on the basis of the rank of the group into which the plurality of location feature values are classified most frequently. For example, if five location feature values are respectively classified into groups of the "rank 3", the "rank 3", the "rank 3", the "rank 2", and the "rank 1", the driver type according to the point is determined to be a type corresponding to the "rank 3" into which the feature values are classified most frequently. By virtue of such a configuration, it is possible to determine the driver type according to the point, even if the location feature values are classified into different groups.

(Supplementary Note 4)

In an evaluating apparatus described in Supplementary Note 4, if a plurality of location feature values are obtained by the first acquirer and if the plurality of location feature values are classified by the classifier into respective different groups, the first type determinator is configured to determine the driver type according to the point of the one driver in the one risk section, on the basis of a score obtained by performing weighting on each of the groups into which the plurality of location feature values are classified, in such a manner that the location feature value that is obtained more lately on a time-series has a larger weight.

According to the evaluating apparatus described in Supplementary Note 4, if the plurality of location feature values of the one driver in the one risk section are classified into different groups, the driver type according to the point of the one driver is determined on the basis of the score obtained by performing the weighting on each of the groups into which the plurality of location feature values are classified. The weighting herein may be performed in such a manner that the location feature value that is obtained more lately on the time-series has a larger weight. For example, if five location feature values are respectively obtained in order of the "rank 2", the "rank 1", the "rank 1", the "rank 3", and the "rank 3", the weighting is performed so as to increase the weight of the rank 3, which is lately obtained. As a result, the score corresponding to the group of the rank 3 is calculated to be high. Thus, the driver type according to the point is determined to be the type corresponding to the "rank 3". By virtue of such a configuration, it is possible to determine the driver type according to the point, even if the location feature values are classified into different groups (and particularly, even if there are more than one group including the same number of location feature values).

(Supplementary Note 5)

In an evaluating apparatus described in Supplementary Note 5, if different driver types according to the point are determined in a plurality of risk sections for the one driver, the second type determinator is configured to determine the driver type according to the point that is most frequently determined, to be the driver type of the one driver.

According to the evaluating apparatus described in Supplementary Note 5, if the driver type according to the point of the one driver varies in the plurality of risk sections, the driver type according to the point that is most frequently determined, is determined to be the driver type of the one driver. For example, if the driver types according to the point in five risk sections are respectively determined to be a "type 2", a "type 1", a "type 3", a "type 3", and a "type 3", the driver type of the one driver is determined to be the "type 3" corresponding to the driver type according to the point that is most frequently determined. By virtue of such a configuration, it is possible to determine the driver type, even if the plurality of driver types according to the point have different ranks.

(Supplementary Note 6)

In an evaluating apparatus described in Supplementary Note 6, the representative feature value is an average value of the plurality of feature values, which are classified into each of the plurality of groups.

According to the evaluating apparatus described in Supplementary Note 6, it is possible to give the rank, easily and accurately, by using the average value of the plurality of feature values, which are classified into each of the groups, as the representative feature value.

(Supplementary Note 7)

An evaluating apparatus described in Supplementary Note 7 is further provided with an extractor configured to extract an unknown risk in a section in which it is evaluated on the basis of the surrounding information that there is no risk, on the basis of the driving data corresponding to a driver of at least one driver type with a driving carefulness degree that is higher than those of other driver types.

A driver of a driver type with a relatively high driving carefulness degree presumably has higher safety consciousness than that of a driver of a driver type with a relatively low driving carefulness degree, and can easily find a risk in the section in which the vehicle travels. Thus, by using the driving data corresponding to the driver of at least one driver type with a driving carefulness degree that is higher than those of the other driver types, it is possible to extract an unknown risk in the section in which it cannot be evaluated only from the surrounding information that there is a risk (or in other words, a section other than the risk section).

(Supplementary Note 8)

An evaluating apparatus described in Supplementary Note 8 is further provided with a calculator configured to calculate a risk value indicating an extent of a risk in the risk section, on the basis of the driving data corresponding to a driver of the driver type in which the driving carefulness degree is at least intermediate.

The driver of the driver type in which the driving carefulness degree is at least intermediate (which means, in addition to this type, there are a driver type with a higher driving carefulness degree and a driver type with a lower carefulness degree) can be estimated to be an average driver whose driving carefulness degree is not extremely high nor low. Thus, by using the driving data corresponding to the driver(s) of the driver type with in which the driving carefulness degree is at least intermediate, the risk value indicating the extent of a risk in the risk section can be calculated as a value that is close to the feelings of most drivers. In other words, it is possible to prevent a value that is close to the feeling of some driver who has extreme characteristics, from being calculated.

(Supplementary Note 9)

An evaluating apparatus described in Supplementary Note 9 is further provided with a calculator configured to calculate a risk value indicating an extent of a risk in the risk section, on the basis of the driving data corresponding to a driver of the driver type which is the same as that of a predetermined driver model.

According to the evaluating apparatus described in Supplementary Note 9, the risk value in the risk section can be calculated as a value that is close to the feeling of a driver model (e.g., a skillful driver) that is set as the predetermined driver model.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An evaluating apparatus comprising:
   a first acquirer configured to obtain a feature value indicating driving behavior of a driver, from driving data of a vehicle in a risk section in which it is evaluated on the basis of surrounding information that there is a risk;
   a classifier configured to classify a plurality of feature values obtained from a plurality of drivers, into a plurality of groups, on the basis of a similarity degree of the driving behavior, which is indicated by each of the plurality of feature values;
   a second acquirer configured to obtain the feature value that is representative in each of the plurality of groups, as a representative feature value;
   a ranking device configured to give a rank corresponding to a driving carefulness degree, to each of the plurality of groups, on the basis of the representative feature value; and
   a determinator configured to determine a driver type corresponding to the driving carefulness degree of the driver, on the basis of a rank of a group into which the feature value of the driver is classified.

2. The evaluating apparatus according to claim 1, wherein said determinator includes: (i) a first type determinator configured to determine a driver type according to the point, which is the driver type of one driver in one risk section, on the basis of a rank of a group into which a location feature value, which is the feature value of the one driver in the one section, is classified; and (ii) a second type determinator configured to determine the driver type of the one driver, on the basis of the driver types according to the point of the one driver in a plurality of risk sections.

3. The evaluating apparatus according to claim 2, wherein if a plurality of location feature values are obtained by said first acquirer and if the plurality of location feature values are classified by said classifier into respective different groups, the first type determinator is configured to determine the driver type according to the point of the one driver in the one risk section, on the basis of a rank of a group into which the plurality of location feature values are classified most frequently.

4. The evaluating apparatus according to claim 2, wherein if a plurality of location feature values are obtained by said first acquirer and if the plurality of location feature values are classified by said classifier into respective different groups, the first type determinator is configured to determine the driver type according to the point of the one driver in the one risk section, on the basis of a score obtained by performing weighting on each of the groups into which the plurality of location feature values are classified, in such a manner that the location feature value that is obtained more lately on a time-series has a larger weight.

5. The evaluating apparatus according to claim 2, wherein if different driver types according to the point are determined in a plurality of risk sections for the one driver, the second type determinator is configured to determine the driver type according to the point that is most frequently determined, to be the driver type of the one driver.

6. The evaluating apparatus according to claim 1, wherein the representative feature value is an average value of the plurality of feature values, which are classified into each of the plurality of groups.

7. The evaluating apparatus according to claim 1, further comprising an extractor configured to extract an unknown risk in a section in which it is evaluated on the basis of the surrounding information that there is no risk, on the basis of the driving data corresponding to a driver of at least one driver type with a driving carefulness degree that is higher than those of other driver types.

8. The evaluating apparatus according to claim 1, further comprising a calculator configured to calculate a risk value indicating an extent of a risk in the risk section, on the basis of the driving data corresponding to a driver of the driver type in which the driving carefulness degree is at least intermediate.

9. The evaluating apparatus according to claim 1, further comprising a calculator configured to calculate a risk value indicating an extent of a risk in the risk section, on the basis of the driving data corresponding to a driver of the driver type which is the same as that of a predetermined driver model.

* * * * *